(12) United States Patent
Tanaka

(10) Patent No.: US 8,014,276 B2
(45) Date of Patent: Sep. 6, 2011

(54) SCHEDULING SYSTEM AND SCHEDULING METHOD FOR THE SAME

(75) Inventor: Kenji Tanaka, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 31 days.

(21) Appl. No.: 12/551,376

(22) Filed: Aug. 31, 2009

(65) Prior Publication Data

US 2009/0316716 A1 Dec. 24, 2009

Related U.S. Application Data

(63) Continuation of application No. 11/350,101, filed on Feb. 9, 2006, now Pat. No. 7,602,715, which is a continuation of application No. 09/974,793, filed on Oct. 12, 2001, now Pat. No. 7,031,315.

(30) Foreign Application Priority Data

Oct. 13, 2000 (JP) ................................ 2000-314299

(51) Int. Cl.
*G01R 31/08* (2006.01)

(52) U.S. Cl. ..................... 370/223; 370/394; 370/395.4; 370/412

(58) Field of Classification Search .................. 370/233, 370/253, 394, 395.4, 412
See application file for complete search history.

(56) References Cited

U.S. PATENT DOCUMENTS

| | | | | |
|---|---|---|---|---|
| 5,862,127 A | * | 1/1999 | Kwak et al. .................... | 370/233 |
| 5,889,779 A | | 3/1999 | Lincoln | |
| 5,987,031 A | | 11/1999 | Miller et al. | |
| 6,018,527 A | * | 1/2000 | Yin et al. .................. | 370/395.41 |
| 6,034,960 A | * | 3/2000 | Beshai et al. .............. | 370/395.4 |
| 6,667,977 B1 | * | 12/2003 | Ono .............................. | 370/392 |
| 6,704,321 B1 | | 3/2004 | Kamiya | |
| 6,731,638 B1 | | 5/2004 | Ofek | |
| 7,031,315 B2 | | 4/2006 | Tanaka | |

(Continued)

FOREIGN PATENT DOCUMENTS

JP 62-102637 5/1987

(Continued)

OTHER PUBLICATIONS

Japanese Office Action dated Mar. 26, 2004 with English translation of pertinent portions.

(Continued)

*Primary Examiner* — Jung Park
(74) *Attorney, Agent, or Firm* — Harrity & Harrity, LLP

(57) ABSTRACT

A scheduling system may include a read sequence management table that includes a group of positions for arranging data received from a group of lines and a schedule management table to store a group of peak rate values that are each associated with one of the group of positions of the read sequence management table. The scheduling system may further include a schedule computation section to determine the association between each of the group of peak rate values and the group of positions based on an availability of the group of positions, store each of the associations in the schedule management table, and select one of the group of positions in the read sequence management table as a starting position to arrange data from a new line, where the selected position is based on a comparison of a peak rate value of the new line and the group of peak rate values stored in the schedule management table.

19 Claims, 16 Drawing Sheets

U.S. PATENT DOCUMENTS

| | | | |
|---|---|---|---|
| 2002/0044554 A1 | 4/2002 | Tanaka | |
| 2002/0172204 A1* | 11/2002 | Tanaka et al. | 370/395.1 |
| 2007/0206946 A1* | 9/2007 | Beshai | 398/4 |

FOREIGN PATENT DOCUMENTS

| | | |
|---|---|---|
| JP | 3-297245 | 12/1991 |
| JP | 11-313071 | 11/1999 |
| WO | WO 97/17779 | 5/1997 |

OTHER PUBLICATIONS

German Office Action dated Nov. 25, 2004.

English Translation of German Office Action, 2004.

Co-pending U.S. Appl. No. 11/350,101, filed Feb. 9, 2006, Kenji Tanaka, entitled "Scheduling System and Scheduling Method for the Same", 72 pages.

* cited by examiner

FIG.3 PRIOR ART

| MANAGEMENT TABLE | (DECIMAL) | (BINARY) | (BINARY) | (DECIMAL) | POSITION OF TIME SLOT |
|---|---|---|---|---|---|
| 1 | 0 | 0 0 0 0 | 0 0 0 0 | 0 | 1 |
| 2 | 1 | 0 0 0 1 | 1 0 0 0 | 8 | 9 |
| 3 | 2 | 0 0 1 0 | 0 1 0 0 | 4 | 5 |
| 4 | 3 | 0 0 1 1 | 1 1 0 0 | 12 | 13 |
| 5 | 4 | 0 1 0 0 | 0 0 1 0 | 2 | 3 |
| 6 | 5 | 0 1 0 1 | 1 0 1 0 | 10 | 11 |
| 7 | 6 | 0 1 1 0 | 0 1 1 0 | 6 | 7 |
| 8 | 7 | 0 1 1 1 | 1 1 1 0 | 14 | 15 |
| 9 | 8 | 1 0 0 0 | 0 0 0 1 | 1 | 2 |
| 10 | 9 | 1 0 0 1 | 1 0 0 1 | 9 | 10 |
| 11 | 10 | 1 0 1 0 | 0 1 0 1 | 5 | 6 |
| 12 | 11 | 1 0 1 1 | 1 1 0 1 | 13 | 14 |
| 13 | 12 | 1 1 0 0 | 0 0 1 1 | 3 | 4 |
| 14 | 13 | 1 1 0 1 | 1 0 1 1 | 11 | 12 |
| 15 | 14 | 1 1 1 0 | 0 1 1 1 | 7 | 8 |
| 16 | 15 | 1 1 1 1 | 1 1 1 1 | 15 | 16 |

−1 ↰  REARRANGEMENT  +1 ↱

FIG.4 PRIOR ART
CELL READ SEQUENCE MANAGEMENT TABLE
| 1 | 2 | 3 | 4 | 5 | 6 | 7 | 8 | 9 | 10 | 11 | 12 | 13 | 14 | 15 | 16 |
A: 1,2  B: 3,4  C: 5
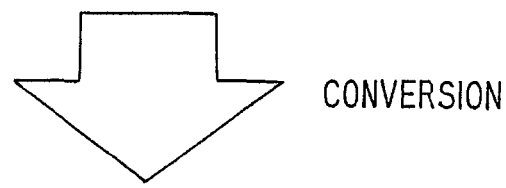
$$\begin{pmatrix} A(PCR=2) \\ B(PCR=2) \\ C(PCR=1) \end{pmatrix}$$
CONVERSION
TIME SLOT
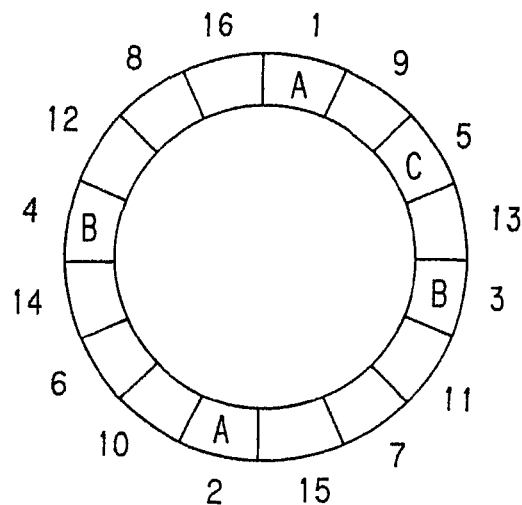
A, B, C : ATM LINE

FIG.5 PRIOR ART
CELL READ SEQUENCE MANAGEMENT TABLE
| 1 | 2 | 3 | 4 | 5 | 6 | 7 | 8 | 9 | 10 | 11 | 12 | 13 | 14 | 15 | 16 |
C   A   B
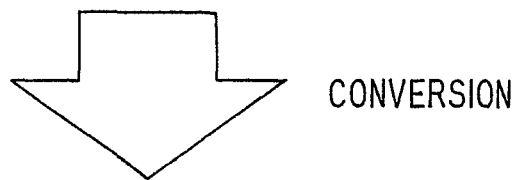
CONVERSION
TIME SLOT
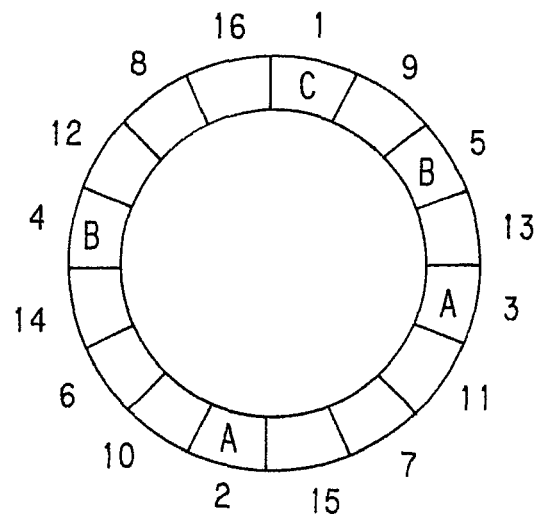
A, B, C : ATM LINE

FIG.9

| EN | FEP |
|---|---|
| 1 | 8 |
| 2 | 15 |
| 4 | 25 |
| 8 | 25 |

EN : TYPE OF PCR VALUE
FEP : OPTIMAL POSITION WHERE LINE
IS NEWLY RECEIVED

SCHEDULING OF CELL READ SEQUENCE MANAGEMENT TABLE

SCHEDULING OF CELL READ SEQUENCE MANAGEMENT TABLE (FLOW 510 - 515 AND 521 - 526)

FIG. 16

SCHEDULING SYSTEM AND SCHEDULING METHOD FOR THE SAME

RELATED APPLICATIONS

This application is a continuation of U.S. patent application Ser. No. 11/350,101 filed Feb. 9, 2006, now U.S. Pat. No. 7,602,715, which is a continuation of U.S. patent application Ser. No. 09/974,793 filed Oct. 12, 2001, now U.S. Pat. No. 7,031,315, the entire contents of which are incorporated by reference herein.

FIELD OF THE INVENTION

The invention relates to the control of cell read in an ATM (asynchronous transfer mode) line, and more particularly to a scheduling system for efficiently reading each cell and a scheduling method for the same.

BACKGROUND OF THE INVENTION

ATM (asynchronous transfer mode) is a communication system for sending or receiving at a high speed all data, to be transmitted, which have been divided into units called "cells" of 53 octets (one octet=8 bits). ATM is suitable for the transfer of large-capacity data, such as multimedia data, and constitutes a basic technique of broadband ISDN.

In ATM, multiplex communication is carried out, and, in addition, the transmission rate can be regulated at a desired value by setting the number of cells sent per given time (cell rate) to a desired value. By virtue of this, even when voices (audio), static images, moving images and the like are present together in an object to be sent, the object can be properly transmitted.

An ATM switch performs large-capacity, high-speed digital switching and mediates communication between terminals. An example of switching conducted by the ATM switch is to cell multiplex a plurality of ATM lines into a single physical transmission path followed by send of the multiplexed cells.

In this case, regarding the sequence of read of data in each ATM line (i.e., the sequence of send of cell in each line), also from the viewpoint of sending data at a proper speed, in sending cells, the individual cells should be dispersed, if possible, at equal spacings, so as to avoid the send of cells in the concentrated state at a time in the same line according to the rate of each line.

For example, in the control of send of cells using a time slot for designating the sequence of send of the individual cells, for example, in order to reduce a burst property at an output port in each ATM line, scheduling should be carried out to properly allocate the individual cells in the same line to respective positions dispersed within the time slot.

For each line. PCR (peak cell rate) is used as a value for designating the maximum speed for sending the cells in the line. PCR indicates the maximum speed at which cells can be transferred in ATM. Further, the minimum spacing for transferring the cells in the same line is determined by the PCR value. Hereinafter, the term "PCR value" in the present specification is used for indicating the number of cells which can be transferred within one time slot in each line. That is, for example, in a line such that the PCR value is "4," four cells can be sent per turn of the time slot.

An example of a conventional technique for allocating cells in each line respectively to positions dispersed within the time slot will be explained. FIG. 4 is a diagram illustrating an example of a conventional scheduling technique for allocating individual cells respectively to positions dispersed within a time slot, wherein the length of the time slot is 16.

At the outset, a cell read sequence management table is provided which is a table having a length corresponding to the maximum number of cells allocable to the time slot (hereinafter, this number of cells is referred to as STENO).

Elements, the number of which is equal to the number of cells transferred within one time slot in each data to be transferred (that is, corresponding to the PCR value of each data), are ensured together within the cell read sequence management table. In the example shown in FIG. 4, the PCR value of ATM lines (or data to be transferred) indicated by "A" and "B" is "2," the PCR value of "C" is "1," and the elements are successively ensured from the head element within the cell read sequence management table.

In the time slot, slots respectively to which the cells are allocated are designated corresponding to the sequence of individual elements in the cell read sequence management table, and the cells in each line to be sent are allocated respective to the designated positions. In the example shown in FIG. 4, the cells of "A" are allocated to slots corresponding to numbers 1 and 2, and the cells of "B" are allocated to slots corresponding to numbers 3 and 4.

In the time slot, the cells allocated to the respective slots are successively sent clockwise. That is, in the sequence in the cell read sequence management table, 1, 9, 5, 13, . . . are sent in that order. Thus, the cells in the same line are sent in the dispersed state. For example, in FIG. 4, the two cells in "A" or "B" are allocated to positions which face each other within the time slot. Therefore, at a rate for sending the two cells in one turn, the cells are successively sent at equal spacing.

Thus, scheduling of the cell read sequence management table based on the PCR value in each ATM line in a service object followed by the control of read according to the scheduled cell read sequence management table can ensure the transfer rate in the transfer of each cell in each ATM line of the service object.

Successive positions in the sequence within the cell read sequence management table can be converted to respective positions dispersed within the time slot, for example, by the following method.

FIG. 2 shows an example of calculation in a method for converting the positions of the cell read sequence management table to respective positions within the time slot, and FIG. 3 shows a list of the results of the conversion.

In this example, a time slot length of 16 is taken as an example. The same is true of other cases where the length is a value obtained by raising 2 to the nth power wherein n is an integer (for example, 32, 64, . . . etc.). Here the length of the cell read sequence management table is equal to the length of the time slot, and thus can be expressed in terms of binary number of which the number of digits is calculated by equation log 2 L wherein L is the length of the table. In this example, log 2 (16)=4 (digits).

As shown in FIG. 2, "1" is first subtracted from each value in the sequence, and the value thus obtained is expressed in terms of binary number of four digits. The numerical values ("0" or "1") of the individual digits expressed in terms of binary number are converted so as to be reversed in sequence. That is, MOB (most significant bit) side and LSB (least significant bit) side in the value expressed in terms of binary number of four digits are reversed in sequence to obtain a new binary number. "1" is added to the binary number thus obtained to determine a value which is regarded us the corresponding time slot position.

For example, in the "8th" within the cell read sequence management table, the subtraction of "1" from this value followed by the expression of the obtained value in terms of a four-digit binary number gives "0111" (=7). These individual digits are rearranged so as to be reversed in sequence to give a value of "1110" (=14). Finally, "1" is added to thin value to obtain the corresponding time slot position "15" as the conversion result.

Here values obtained by raising 2 to the nth power, wherein n is an integer, are used as the maximum rate (PCR value) of the band in each service ATM line, and the cell read sequence management table is scheduled based on the PCR values. The use of values obtained by raising 2 to the nth power, wherein n is an integer, (i.e., 1, 2, 4, 8, . . . etc.) as the PCR value is common in the art. In this method, the properties of the binary number can be utilized, and the processing can be simplified.

In particular, this conversion method is suitable in the case where, in the cell read sequence management table, elements corresponding to the PCR value (value obtained by raising 2 to the nth power wherein n is an integer) are continuously ensured from a position which is one ahead of the position corresponding to a value obtained by multiplying the PCR value by an integer, that is, a position which is next to the position corresponding to a value obtained by multiplying the PCR value by an integer. The elements, which have been ensured here, are dispersed at equal spacings in the time slot. Further, ensuring the elements corresponding to the PCR value (value obtained by raising 2 to the nth power wherein n is an integer) from one ahead of the position corresponding to a value obtained by multiplying the PCR value by an integer can be simply achieved by arranging the elements corresponding to the PCR value in each line in the descending order of the PCR values from the head.

For example, in the example shown in FIG. 4, the three lines "A," "B," and "C" having respective PER values of "2," "2," and "1" are successively arranged in the descending order of the PCR values to ensure the elements corresponding to the PCR values in the cell read sequence management table. This permits the elements to be allocated at equal spacings to the time slot, whereby cells in each line are sent at equal intervals.

Further, to the contrary, in the prior art, in order to transfer cells sent from each line at an even rate, in the cell read sequence management table, the elements for each line are successively arranged so that the PCR values are in descending order by the above method.

In the ATM switch which transfers cells in each of the ATM lines, however, data is not always sent at a stationary data transfer rate. That is, in some cases, the transfer of data is ended halfway in each line, or, on the contrary, in some cases, in each line, new data transfer is started.

For this reason, in the conventional ATM switch, as described above, the individual lines are scheduled from the head of the cell read sequence management table in the descending order of PCR values and, at the same time, so as to avoid the occurrence of an unused idle area between lines, and the positions of each line within the cell read sequence management table are properly updated.

Next, a conventional scheduling system will be explained wherein a cell read sequence management table is scheduled by the above method.

FIG. 6 is a block diagram showing the construction of a scheduling system 10a for controlling the read of cells in a conventional ATM line.

Referring now to FIG. 6, in a conventional scheduling system 100a, data received in a line setting interface 10 is first supplied to a schedule computation section 20a, and calculation for scheduling of the cell read management table is executed.

An allocation processor 30 sets, in a time slot 40, the result of scheduling calculated by the schedule computation section 20a. In other words, the allocation processor 30 converts the individual elements in the cell read management table to respective positions in the time slot 40 by the conversion method shown in FIGS. 2 and 3.

Shaping service, which has assured the rate of each ATM line, can be carried out by reading an ATM line, input into the device, from a connection input queue 50 to a shaping service output queue 60 according to the time slot setting.

The construction and operation of the conventional schedule computation section 20a shown in FIG. 6 are as follows.

Specifically, data sent from the line setting interface 10 is processed in a parameter processor, and is output to a schedule object computation section. Upon new receive of line or delete of line, the schedule object computation section computes a line, in the cell read sequence management table, of which the position is to be changed. In the conventional schedule computation section 20, ATM lines as the schedule change object are a part of lines having the same PCR value as PCR values of lines, of which a line is to be newly received or deleted, and all of lines having a smaller PCR value.

A schedule clear section clears the cell read sequence management table of which the schedule is to be changed. The schedule computation section performs scheduling in the descending order of PCR values of lines (i.e., a line having a larger PCR value among the lines as the computed schedule change object is scheduled in an earlier stage) in a successive manner from the head of idle areas in the cell read sequence management table. The reason for this is that scheduling in the descending order of PCR values of lines can provide better receive efficiency of the cell read sequence management table from the viewpoint of assuring the rate of ATM lines to be shaped.

Further, as described above, when PCR values are values obtained by raising 2 to the nth power, wherein n is an integer, scheduling in the descending order of PCR values of lines (i.e., a line having a larger PCR value is scheduled in an earlier stage) from the head of idle areas in the cell read sequence management table can ensure positions assuring the rate in the cell read management table.

Here when lines have not been aligned, that is, when the individual lines have been successively scheduled from the head in idle areas of the cell read sequence management table without alignment, however, the arrangement of lines in the descending order is broken and, consequently, there is a fear of the assurance of line rate being lost.

FIG. 5 is a diagram illustrating the read of cells in the case where the arrangement of lines in descending order in a cell read sequence management table has been broken. In FIG. 5, three lines shown in FIG. 4 are arranged in the order of "C," "A," and "B," that is, in the order of PCR values "1," "2," and "2." Unlike the example of FIG. 4 in which cells have been sent at equal intervals, in the lines "A" and "B," cells are sent at uneven intervals which do not satisfy a send interval requirement indicated by the PCR value.

Therefore, in the prior art, when a schedule is newly received or changed, as described above, the individual lines as the processing object should be aligned.

As described above, in the conventional scheduling system, every time when a change has occurred in a line to be cataloged in the cell read sequence management table, troublesome processing should be carried out such that all the cataloged lines are aligned in the descending order of PCR values and rearranged from the head.

An example of a conventional measure devised to deal with this problem is as follows. In order that, among lines cataloged in the cell read sequence management table, lines having a larger PCR value than the PCR value of the line, in which the change has occurred, do not undergo a change in the position within the cell read sequence management table upon the rescheduling, the object of the position conversion processing is limited only to a part of lines having the same PCR value as the PCR value of the line, in which the change has occurred, and all the lines having smaller PCR values than the line, in which the change has occurred, followed by computation of rescheduling. Even when the object of the rescheduling is limited to a narrower range in this way, however, there remains the necessity of executing troublesome processing such that, every time when a change, such as new addition of a line, has occurred, the lines are aligned and rearranged.

SUMMARY OF THE INVENTION

Accordingly, it is a first object of the invention to provide a scheduling system, which can solve the above problems of the prior art and, without requiring, for example, complicate construction and complicate processing, can assure the rate of each line and can execute high-speed, high-capacity data transfer, and a scheduling method for said scheduling system.

It is a second object of the invention to provide a scheduling system, which can solve the above problems of the prior art and can significantly reduce the necessity of update of the cell read sequence management table through the provision of an additional table for properly managing and updating positions of individual lines within the cell read sequence management table, and a scheduling method for said scheduling system.

According to the first feature of the invention, a scheduling system comprises:

a time slot for specifying the transfer sequence of individual lines in one turn, in which each cell is transferred, in slots indicating respective points in the turn;

a cell read sequence management table which has elements in the same number as the number of slots provided in the time slot and sets the lines as cell transfer objects to the elements;

schedule computation means for controlling the setting of the lines to the cell read sequence management table;

allocation processing means for converting the elements of the cell read sequence management table respectively to specified positions of the slots in the time slot; and a schedule management table for indicating positions, within the cell read sequence management table, to which transfer object lines are newly set, for each PCR value of the lines, said PCR value being the number of cells, transferred from the line, per cell transfer turn and representing the cell send rate of each line, the specified line cells being successively transferred for each turn according to the sequence specified in the time slot, the cell read transfer sequence in each line being controlled according to the cell send rate in each of the lines.

In the scheduling system according to the first feature of the invention, the schedule computation means preferably comprises:

means which, when a requirement is satisfied such that there is an idle element, in the cell read sequence management table, which is located one element ahead of a position of an element corresponding to a value obtained by multiplying the specified PCR value by an integer, and the contemplated line can be set to continuous elements starting from the idle element and corresponding to the specified PCR value and, in addition, when an element is present in the heading area of the continuous elements, functions to catalog the position of said element, which is located one element ahead of a position of an element corresponding to a value obtained by multiplying the specified PCR value by an integer, as data indicating the set position of the line having the specified PCR value, in relation with the PCR value in the schedule management table;

means which, when a line to be newly transferred has occurred, newly sets the line to continuous elements corresponding to the PCR value of the line, in the cell read sequence management table, from the set position corresponding to the PCR value of the line recorded in the schedule management table;

means which, when the communication of a line being currently transferred has been deleted, cancels the setting of the line from the element, in the cell read sequence management table, to which the line has been set; and means which, when new setting or delete of a transfer object line has occurred, updates the catalog of the schedule management table.

In the scheduling system according to the first feature of the invention, the allocation processing means preferably comprises:

means which converts the elements within the cell read sequence management table, to respective specified positions within the time slot, based on the designation of the slot position as the conversion destination for each element specified in such a manner that the continuous elements corresponding to the PCR value, that have been ensured from a position which is one element ahead of a position of an element corresponding to a value obtained by multiplying the PCR value by an integer, in the cell read sequence management table are converted to respective positions dispersed at equal spacings in the time slot; and means which, when a line is in the state of being set to elements in the cell read sequence management table, performs specifying and setting, in a slot as the conversion destination of the line in the time slot, so as to transfer cells of the line.

In the scheduling system according to the first feature of the invention, preferably, the number of slots in the time slot and the PCR value of each of the lines each are a value obtained by raising "2" to the nth power, wherein n is a non-negative integer.

In the scheduling system according to the first feature of the invention, preferably, the conversion from the cell read sequence management table to the rime slot is carried out by a method comprising the steps of:

raising "2" to the "Ath" power, wherein "A" is an integer, to provide a value as the length of the time slot;

indicating the positions of the individual elements in the cell read sequence management table and the slot positions of the time slot by using continuous numbers from "1" to the value of the time slot length;

taking each element from the cell read sequence management table;

subtracting "1" from the value of the continuous numbers in the element and expressing the obtained value in terms of binary number of "A" digits while, when a high order value is absent, supplementing "0";

converting the numerical values of the "A" digits expressed in terms of binary number so as to be reversed in sequence with respect to the arrangement from higher order digit to lower order digit to provide a converted binary number of "A" digits; and adding "1" to the value of the converted binary number of "A" digits to determine a value as a slot position, in the time slot, which is the element conversion destination.

In the scheduling system according to the first feature of the invention, preferably, the schedule computation means performs a function such that, upon the cancellation of the setting of a line from the elements in the cell read sequence management table, if another line having a smaller PCR value than said line is in the state of being set to a position behind the position to which the said line has been set, the set position of said another line is moved to the position from which the setting of said line has been cancelled.

In the scheduling system according to the first feature of the invention, preferably, the schedule computation means performs a function such that, upon the cancellation of the setting of a line from the elements in the cell read sequence management table, if other lines having a smaller PCR value than said line are in the state of being set to positions behind the position to which the said line has been set, the set position of one line, which has the largest PCR value in said other lines and is located in the rearmost position of said other lines, is moved to the position from which the setting of said line has been cancelled.

In the scheduling system according to the first feature of the invention, the line may be an ATM line.

According to the second feature of the intention, a scheduling method comprises the steps of:

indicating the send rate or cells in each line in terms of PCR value which is the number of cells, transferred from the line, per cell transfer turn;

successively transferring cells of a specified line according to the sequence specified in slots, in a time slot for specifying the transfer sequence of individual lines in the cell transfer turn, indicating each point in the turn;

controlling the setting of each line in a cell read sequence management table which has elements in the same number as the number of slots provided in the time slot and sets the lines as cell transfer objects to the elements;

converting the individual elements in the cell read sequence management table to respective specified slot positions in the time slot; and properly updating and making reference to a schedule management table which indicates positions, within the cell read sequence management table, to which transfer object lines are newly set, for each PCR value of the lines, the cell read transfer sequence in each line being controlled according to the cell send rate in each of the lines.

The scheduling method according to the second feature of the invention may further comprise the steps of:

when a requirement is satisfied such that there is an idle element, in the cell read sequence management table, which is located one element ahead of a position of an element corresponding to a value obtained by multiplying the specified PER value by an integer, and the contemplated line can be set to continuous elements starting from the idle element and corresponding to the specified PCR value and, in addition, when an element is present in the heading area of the continuous elements, cataloging the position of said element, which is located one element ahead of a position of an element corresponding to a value obtained by multiplying the specified PCR value by an integer, as data indicating the set position of the line having the specified PCR value within the cell read sequence management table, in relation with the PCR value in the schedule management table;

when a line to be newly transferred has occurred, newly setting the line to continuous elements corresponding to the PCR value of the line, in the cell read sequence management table, from the set position corresponding to the PCR value of the line recorded in the schedule management table;

when the communication of a line being currently transferred has been deleted, canceling the setting of the line from the element, in the cell read sequence management table, to which the line has been set; and when new setting or delete of a transfer object line has occurred, updating the catalog of the schedule management table.

The scheduling method according to the second feature of the invention may further comprise the steps of:

converting the elements within the cell read sequence management table, to respective specified positions within the time slot, based on the designation of the slot position as the conversion destination for each element specified in such a manner that the continuous elements corresponding to the PCR value, that have been ensured from a position which is one element ahead of a position of an element corresponding to a value obtained by multiplying the PCR value by an integer, in the cell read sequence management table are converted to respective positions dispersed at equal spacings in the time slot; and when a line is in the state of being set to elements in the cell read sequence management table, performing specifying and setting, in a slot as the conversion destination of the line in the time slot, so as to transfer cells of the line.

In the scheduling method according to the second feature of the invention, preferably, the number of slots in the time slot and the PCR value of each of the lines each are a value obtained by raising "2" to the nth power, wherein n is a non-negative integer.

In the scheduling method according to the second feature of the invention, preferably, the conversion from the cell read sequence management table to the time slot is carried out by a method comprising the steps of:

raising "2" to the "Ath" power, wherein "A" is an integer, to provide a value as the length of the time slot;

indicating the positions of the individual elements in the cell read sequence management table and the slot positions of the time slot by using continuous numbers from "1" to the value of the time slot length;

taking each element from the cell read sequence management table;

subtracting "1" from the value of the continuous numbers in the element and expressing the obtained value in terms of binary number of "A" digits while, when a high order value is absent, supplementing "0";

converting the numerical values of the "A" digits expressed in terms of binary number so as to be reversed in sequence with respect to the arrangement from higher order digit to lower order digit to provide a converted binary number of "A" digits; and adding "1" to the value of the converted binary number of "A" digits to determine a value as a slot position, in the time slot, which is the element conversion destination.

In the scheduling method according to the second feature of the invention, preferably, upon the cancellation of the setting of a line from the elements in the cell read sequence management table, if another line having a smaller PCR value than said line is in the state of being set to a position behind the position to which the said line has been set, the set position of said another line is moved to the position from which the setting of said line has been cancelled.

In the scheduling method according to the second feature of the invention, preferably, upon the cancellation of the setting of a line from the elements in the cell read sequence management table, if other lines having a smaller PCR value than said line are in the state of being set to positions behind the position to which the said line has been set, the set position of one line, which has the largest PCR value in said other lines and is located in the rearmost position of said other lines, is moved to the position from which the setting of said line has been cancelled.

In the scheduling method according to the second feature of the invention, the line may be an ATM line.

According to the third feature of the invention, an ATM switch comprises a scheduling system such that the cell read transfer sequence in each ATM line is controlled according to the cell send rate in each of the ATM lines, wherein said scheduling system expresses the cell send rate, in each of the ATM lines, in terms of PCR value, which is the number of cells, transferred from the ATM line, per cell transfer turn and comprises:

a time slot for specifying the transfer sequence of the ATM lines in one turn, in which each cell is transferred, in slots indicating respective points in the turn;

a cell read sequence management table which has elements in the same number as the number of slots provided in the time slot and sets the ATM lines as cell transfer objects to the elements;

schedule computation means for controlling the setting of the ATM lines to the cell read sequence management table;

allocation processing means for converting the elements of the cell read sequence management table respectively to specified positions of the slots in the time slot; and a schedule management table for indicating positions, within the cell read sequence management table, to which transfer object ATM lines are newly set, for each PCR value of the ATM lines, the specified ATM line cells being successively transferred for each turn according to the sequence specified in the time slot.

In the ATM switch according to the third feature of the invention, preferably, the schedule computation means comprises:

means which, when a requirement is satisfied such that there is an idle element, in the cell read sequence management table, which is located one element ahead of a position of an element corresponding to a value obtained by multiplying the specified PCR value by an integer, and the contemplated ATM line can be set to continuous elements starting from the idle element and corresponding to the specified PCR value and, in addition, when an element is present in the heading area of the continuous elements, functions to catalog the position of said element, which is located one element ahead of a position of an element corresponding to a value obtained by multiplying the specified PCR value by an integer, as data indicating the set position of the ATM line having the specified PCR value, in relation with the PCR value in the schedule management table;

means which, when an ATM line to be newly transferred has occurred, newly sets the ATM line to continuous elements corresponding to the PCR value of the ATM line, in the cell read sequence management tabled from the set position corresponding to the PCR value of the ATM line recorded in the schedule management table;

means which, then the communication of an ATM line being currently transferred has been deleted, the setting of the ATM line is cancelled from the element, in the cell read sequence management table, to which the ATM line has been set; and means which, when new setting or delete of a transfer object ATM line has occurred, updates the catalog of the schedule management table.

In the ATM switch according to the third feature of the invention, preferably, the allocation processing means comprises:

means which converts the elements within the cell read sequence management table, to respective specified positions within the time slot, based on the designation of the slot position as the conversion destination for each element specified in such a manner that the continuous elements corresponding to the PCR value, that have been ensured from a position which is one element ahead of a position of an element corresponding to a value obtained by multiplying the PCR value by an integer, in the cell read sequence management table are converted to respective positions dispersed at equal spacings in the time slot; and means which, when an ATM line is in the state of being set to elements in the cell read sequence management table, performs specifying and setting, in a slot as the conversion destination of the ATM line in the time slot, so as to transfer cells of the ATM line.

In the ATM switch according to the third feature of the invention, preferably, the number of slots in the time slot and the PCR value of each of the ATM lines each are a value obtained by raising "2" to the nth power, wherein n is a non-negative integer.

In the ATM switch according to the third feature of the invention, preferably, the conversion from the cell read sequence management table to the time slot is carried out by a method comprising the steps of:

raising "2" to the "Ath" power, wherein "A" is an integer, to provide a value as the length of the time slot;

indicating the positions of the individual elements in the cell read sequence management table and the slot positions of the time slot by using continuous numbers from "1" to the value of the time slot length;

taking each element from the cell read sequence management table;

subtracting "1" from the value of the continuous numbers in the element and expressing the obtained value in terms of binary number of "A" digits while, when a high order value in absent, supplementing "0";

converting the numerical values of the "A" digits expressed in terms of binary number so as to be reversed in sequence with respect to the arrangement from higher order digit to lower order digit to provide a converted binary number of "A" digits; and adding "1" to the value of the converted binary number of "A" digits to determine a value as a slot position, in the time slot, which is the element conversion destination.

In the ATM switch according to the third feature of the invention, preferably, the schedule computation means performs a function such that, upon the cancellation of the setting of an ATM line from the elements in the cell read sequence management table, if another ATM line having a smaller PCR value than said ATM line is in the state of being set to a position behind the position to which the said ATM line has been set, the set position of said another ATM line is moved to the position from which the setting of said ATM line has been cancelled.

In the ATM switch according to the third feature of the invention, preferably, the schedule computation means performs a function such that, upon the cancellation of the setting of an ATM line from the elements in the cell read sequence management table, if other ATM lines having a smaller PCR value than said ATM line are in the state of being set to positions behind the position to which the said ATM line has been set, the set position of one ATM line, which has the largest PCR value in said other ATM lines and is located in the rearmost position of said other ATM lines, is moved to the position from which the setting of said ATM line has been cancelled.

BRIEF DESCRIPTION OF THR DRAWINGS

The invention will be explained in more detail in conjunction with the appended drawings, wherein;

FIG. 3 is a diagram showing a list of conversion results obtained by the computation method shown in FIG. 2;

FIG. 4 is a diagram illustrating an example of scheduling for allocating individual cells respectively to positions dispersed within a time slot;

FIG. 5 is a diagram illustrating the read of cells in the case where the arrangement of lines in descending order has been broken in the conventional cell read sequence management table:

FIG. 9 is a diagram showing an example of a schedule management table in the first preferred embodiment of the invention;

Figure 14:
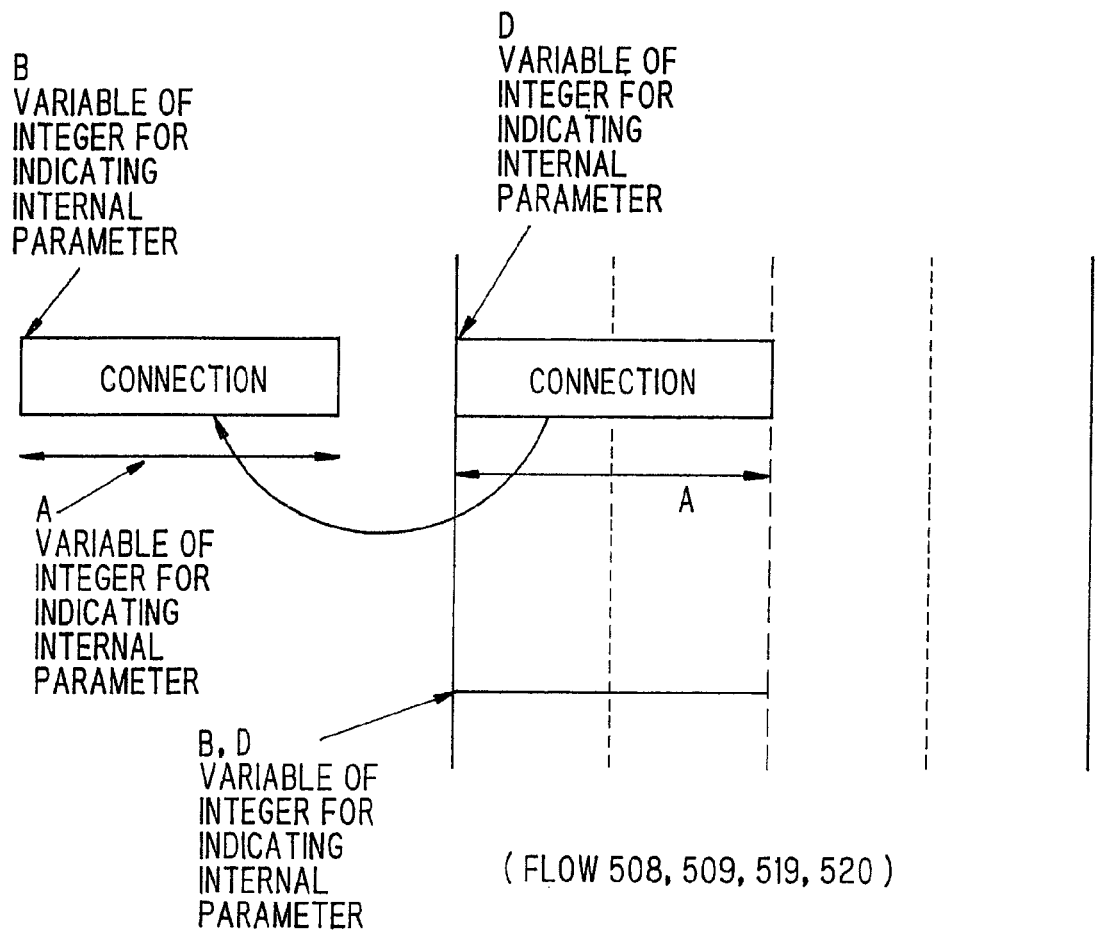
Figure 15:
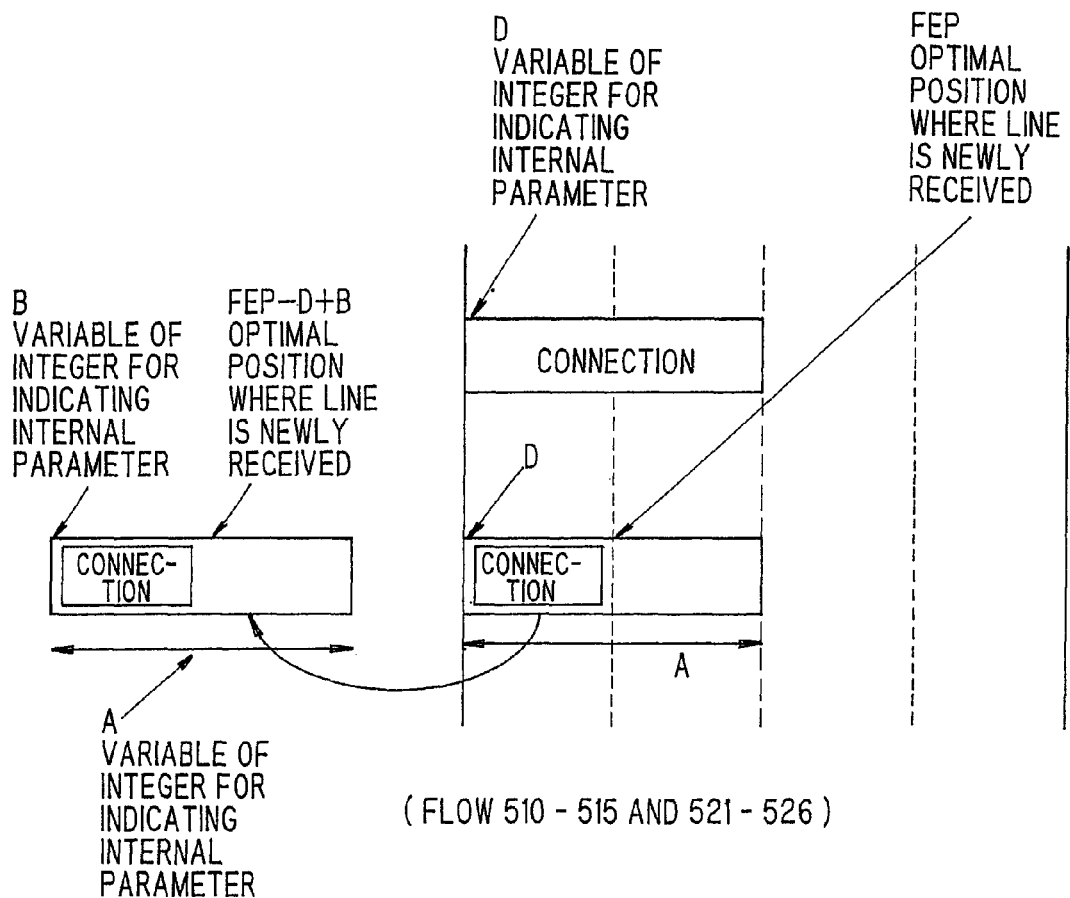

FIG. 14 in a diagram illustrating an example of the movement of a move object line in the first preferred embodiment of the invention:

FIG. 15 is a diagram illustrating an example of the correction of allocation position of a schedule management parameter in the first preferred embodiment of the invention; and FIG. 16 is a diagram showing an example of scheduling of a cell read sequence management table in the first preferred embodiment of the invention.

DESCRIPTION OF THE PREFERRED EMBODIMENTS

Preferred embodiments of the invention will be explained in detail in conjunction with the accompanying drawings.

Figure 7:
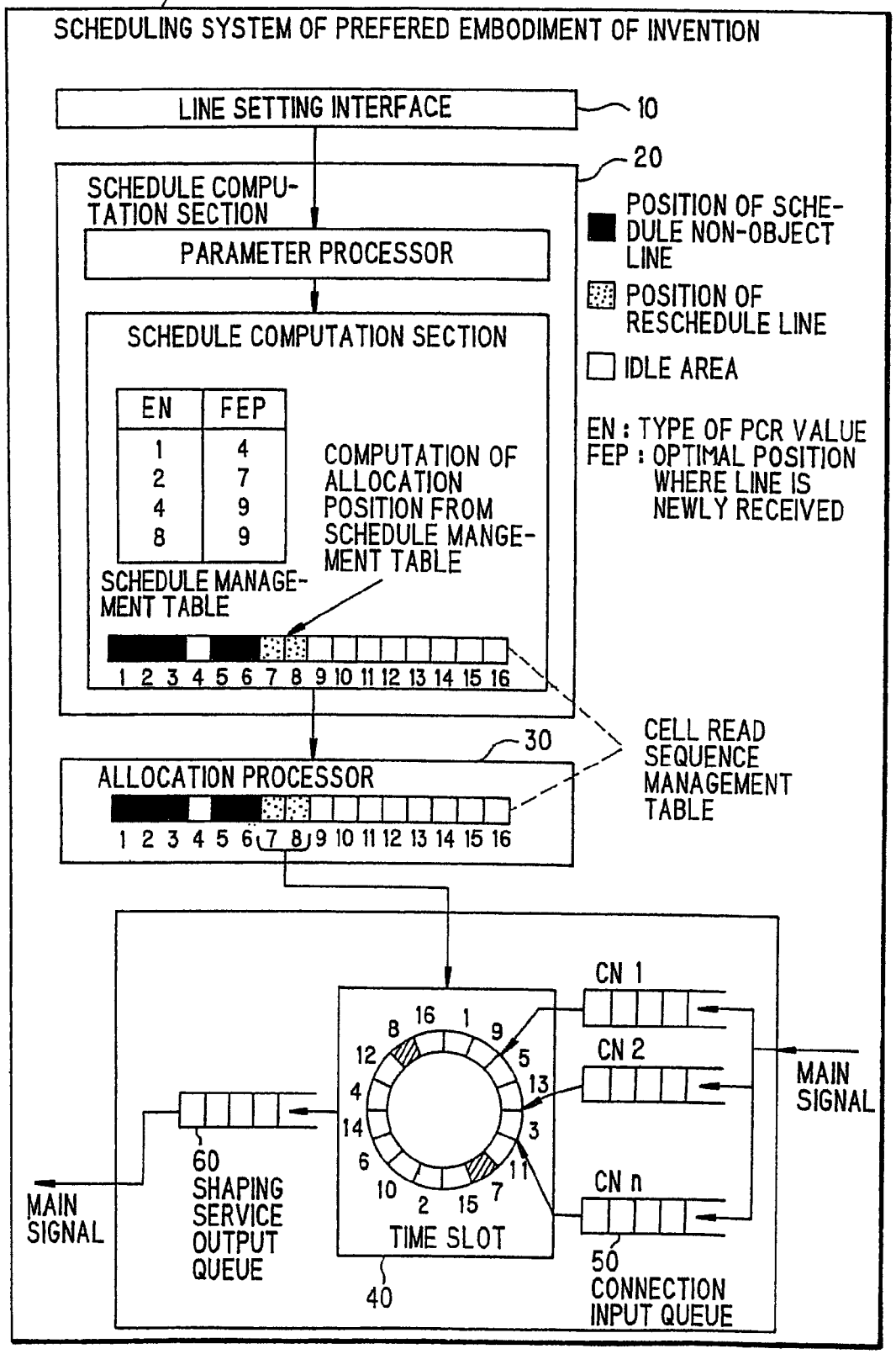
FIG. 7 is a block diagram showing the construction of a scheduling system according to a first preferred embodiment of the invention.

FIG. 7 is a block diagram showing the construction of a scheduling system in a first preferred embodiment of the invention.

The scheduling system according to this preferred embodiment of the invention is a system which manages the sequence of the read of cells for each ATM line, for example, in an ATM switch. In this system, each line is properly set in a cell read sequence management table for setting the sequence of the read of cells, thereby managing the sequence of the read of cells.

Further, as explained below, each line is efficiently set in the cell read sequence management table to realize the update of the cell read sequence management table by minimized processing, even in an environment such that the receive or delete of lines is repeatedly carried out.

Figure 6:
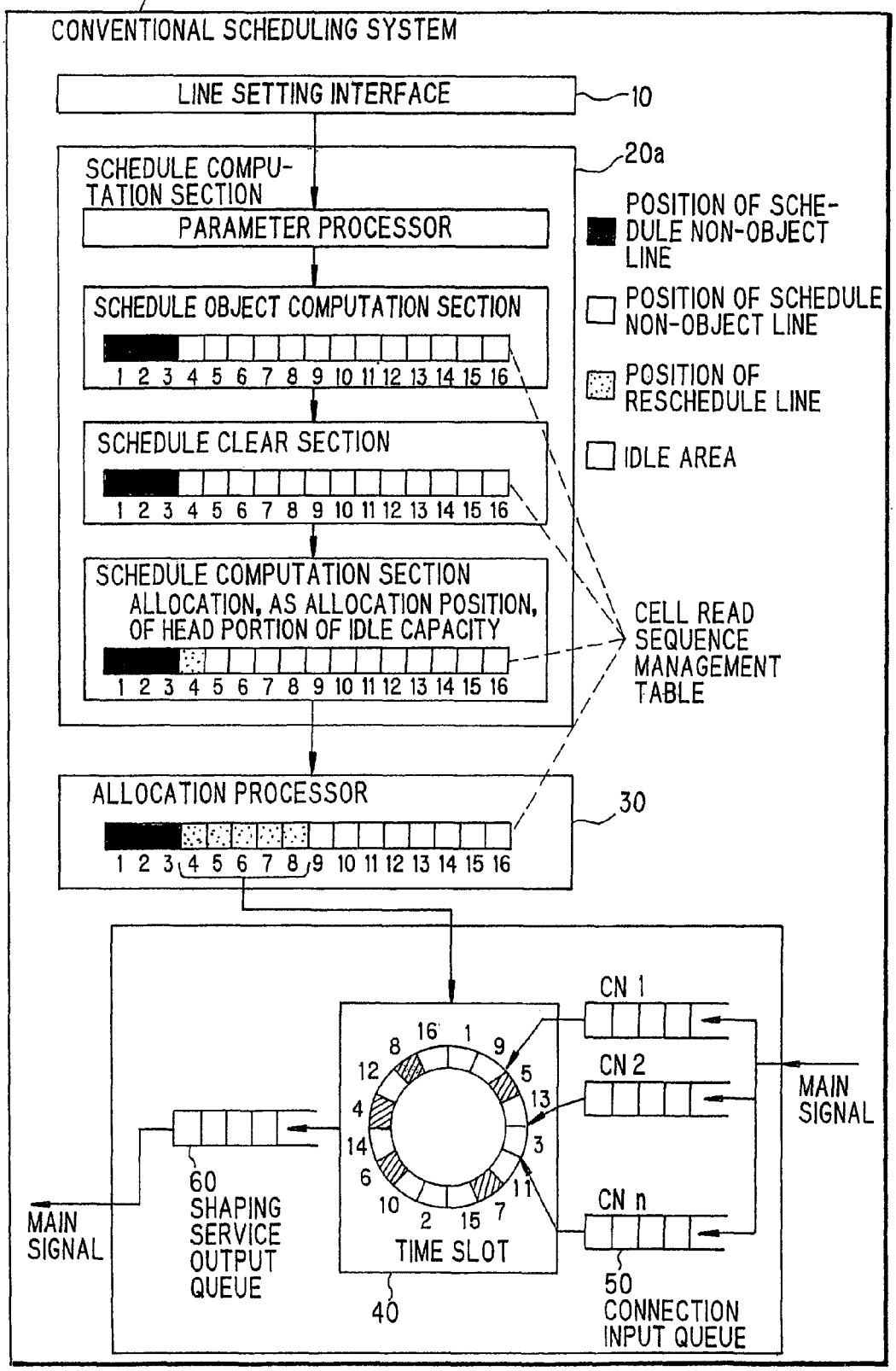
FIG. 6 is a block diagram showing the construction of a conventional scheduling system.

Referring now to FIG. 7, a scheduling system 100 according to this preferred embodiment comprises a line setting interface 10, a schedule computation section 20, an allocation processor 30, and a time slot 40, and receives a connection input queue 50 and outputs a shaping service output queue 60. Each of these sections can realize, for example, using a semiconductor circuit or the like for executing the processing of each of the sections. The scheduling system 100 shown in FIG. 7 is different from the conventional scheduling system 100a shown in FIG. 6 mainly in a schedule computation section 20 and its processing which will be explained later.

Figure 8:
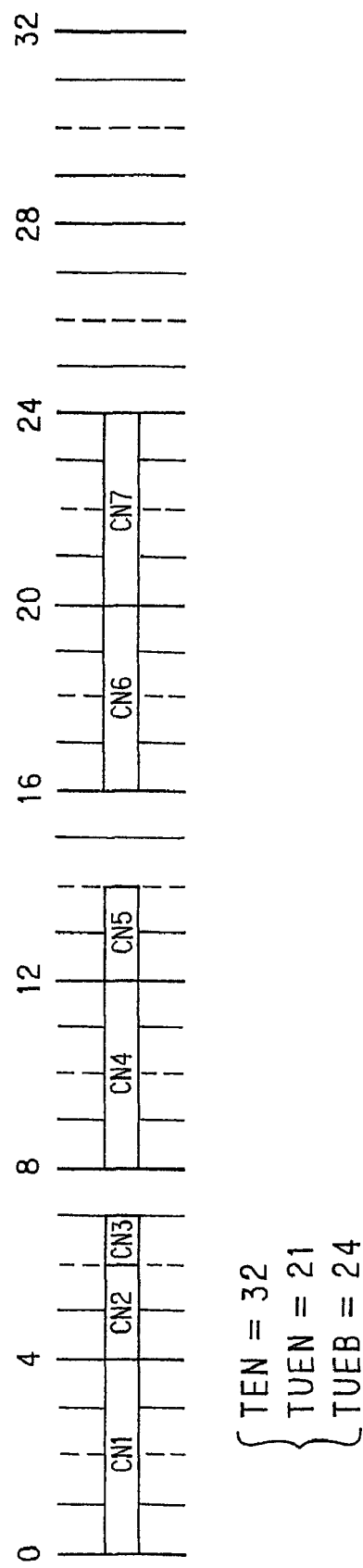
FIG. 8 is a diagram showing an example of a cell read sequence management table in the first preferred embodiment of the invention.

FIG. 8 is a diagram showing an example of a cell read sequence management table in the first preferred embodiment of the invention.

According to the scheduling system in this preferred embodiment, the schedule computation section 20 performs control in such a manner that individual lines are ensured, based on PCR values (obtained by raising 2 to the nth power wherein n is an integer), in the cell read sequence management table from its position which is one ahead of the position corresponding to a value obtained by multiplying the PCR value by an integer. The ensured individual lines are converted according to the method for convention to a time slot exemplified in FIGS. 2 and 3, and cells in the lines are read and transferred in the converted sequence in the time slot. As described above in the column of the background of the invention, the elements of the lines ensured from the position, which is one ahead of the position corresponding to a value obtained by multiplying the PCR value by an integer, as described above in connection with the example shown in FIG. 8, are positioned at equal spacings within the time slot, and, thus, proper transfer of cells according to the send rate of each line can be realized.

When the line can be ensured in a plurality of sites, the line is ensured in the first site (the smallest number site). In this case, since a wide unused area is ensured in the rear part of the table, subsequent new lines can be efficiently ensured.

Here in the conventional scheduling system 10a, when the receive or delete of a line has occurred, all the positions of the lines in the cell read sequence management table should be aligned. This is necessary for properly ensuring the lines from the position which is one ahead of the position corresponding to a value obtained by multiplying the PCR value by an integer.

By contrast, in the scheduling system in the present preferred embodiment, proper line scheduling can be realized, without necessity of alignment processing, by the provision of a schedule management table showing proper allocation positions based on the PCR values of the lines and the arrangement of the lines in designated positions of the table, rather than the adoption of the method wherein the lines are aligned in the descending order of PCR values.

FIG. 9 is a diagram showing an example of a schedule management table, in the present preferred embodiment, with respect to the example of the cell read sequence management table shown in FIG. 8. In FIG. 9, PCR values of lines are shown in the column of "EN," and proper allocation positions corresponding respectively to the PCR values of the lines are shown in the column of "FEP."

Here, as described above, the proper allocation positions of the lines in the schedule management table begin from the position which is one ahead of the position corresponding to a value obtained by multiplying the PCR value of the line by an integer and, at the same time, has the smallest number.

The line having a PCR value of "1" can be allocated to the "8th" position of the cell read sequence management table, and the line having a PCR value of "2" can be allocated to the "15th" position of the cell read sequence management table. Lines hating a PCR value of "4" or more cannot be allocated to idle areas between other lines and are allocated from the "25th" position which is the final position.

When a new line has been positioned based on the schedule management table or when a line has been deleted, the schedule computation section 20 updates the values in the cell read sequence management table. The update of the schedule management table is much simpler than the conventional alignment processing which requires the operation of the cell read sequence management table per se. Therefore, a significant reduction in processing necessary for scheduling can be realized.

Thus, in the scheduling system according to this preferred embodiment, the use of the schedule management table permits the lines to be properly ensured from the position, which is one ahead of the position corresponding to a value obtained by multiplying the PCR value of the line by an integer, without the necessity of alignment of the cell read sequence management table.

In the cell read sequence management table in this preferred embodiment, as is apparent from the example shown in FIG. 8, even when an idle area has occurred between the ensured line areas or even when the arrangement in the descending order of PCR values of the cells has been broken, there is no need to execute the processing of alignment of the lines.

When there is an idle area between the ensured line areas, however, the movement of a line in the rear part of the cell read sequence management table so as to fill the idle area permits a wider unused area to be ensured in the rear part. Therefore, such move processing is useful. Accordingly, in an example which is effective in this preferred embodiment, the following method is considered. At the time of the delete of a line from the cell read sequence management table, when an idle area has occurred between the lines or when the idle area has been expanded, a search is made for whether or not there is a line, which can fill the idle area, behind the idle area. When the contemplated line is present, the line is moved into the idle area to fill the idle area or to narrow the idle area. The processing for moving one line in this method is much simpler than the processing for aligning all the lines. Therefore, in addition to the effect of reducing scheduling, the effect of ensuring a wider unused area can be attained.

In another example, a method is also considered wherein, when a line is newly cataloged in the cell read sequence management table or when the line in the above example is moved, only a line having the longest PCR value, which can be cataloged in the idle area, is cataloged in the idle area between the ensured line areas. That is, in the example shown in FIG. 8, a line having a PCR value of "2" can be cataloged in idle areas located at the 15th to 16th positions, and, thus, even when the idle area located at the 8th position has already been filled, a line having a PCR value of "1" is cataloged in the 25th position, which is the final position, rather than the idle area located at the 15th position. This can be realized, in the same manner as in the above examples, through the determination of each value of the schedule management table by the schedule computation section 20 so as to realize the above scheduling.

Next, the operation of an example of the scheduling system according to the present preferred embodiment, including computation processing in the schedule computation section 20, will be explained in detail.

Various parameters, which the schedule computation section 20 uses for the computation of schedule, will be first explained.

As shown in FIG. 7, the internal schedule computation section in the schedule computation section 20 is provided with a schedule management table. As explained above, the schedule management table is a table which, for each type of PCR value "EN" (here 1, 2, 4, 8), shows the optimal position "FEP" in the case of the receive of new lines. The receive of the individual lines in respective positions indicated in this table can assure the send rate of the lines.

Further, the schedule computation section 20 has, as parameters, the total number of entries "TEN" indicating the length of the cell road sequence management table, the total number of used entries "TUEN" indicating the total number of entries, in the cell read sequence management table, to which lines have been allocated, and the final box number "TUEB" indicating the cell read sequence management table in its rear end to which the line has been allocated. The schedule computation section 20 manages these values and updates these parameters according to the update of the cell read sequence management table.

For example, in the example shown in FIG. 8, the value of the total number of entries "TEN" is "32," the value of the total number of used entries "TUEN" is "21," and the value of the final box number "TUEB" is "24."

Further, for the explanation of the processing in the schedule computation section 20, "A," "B," "C," "D," "E," and "F" each are used as variables of integers for indicating internal parameters.

Figure 10:
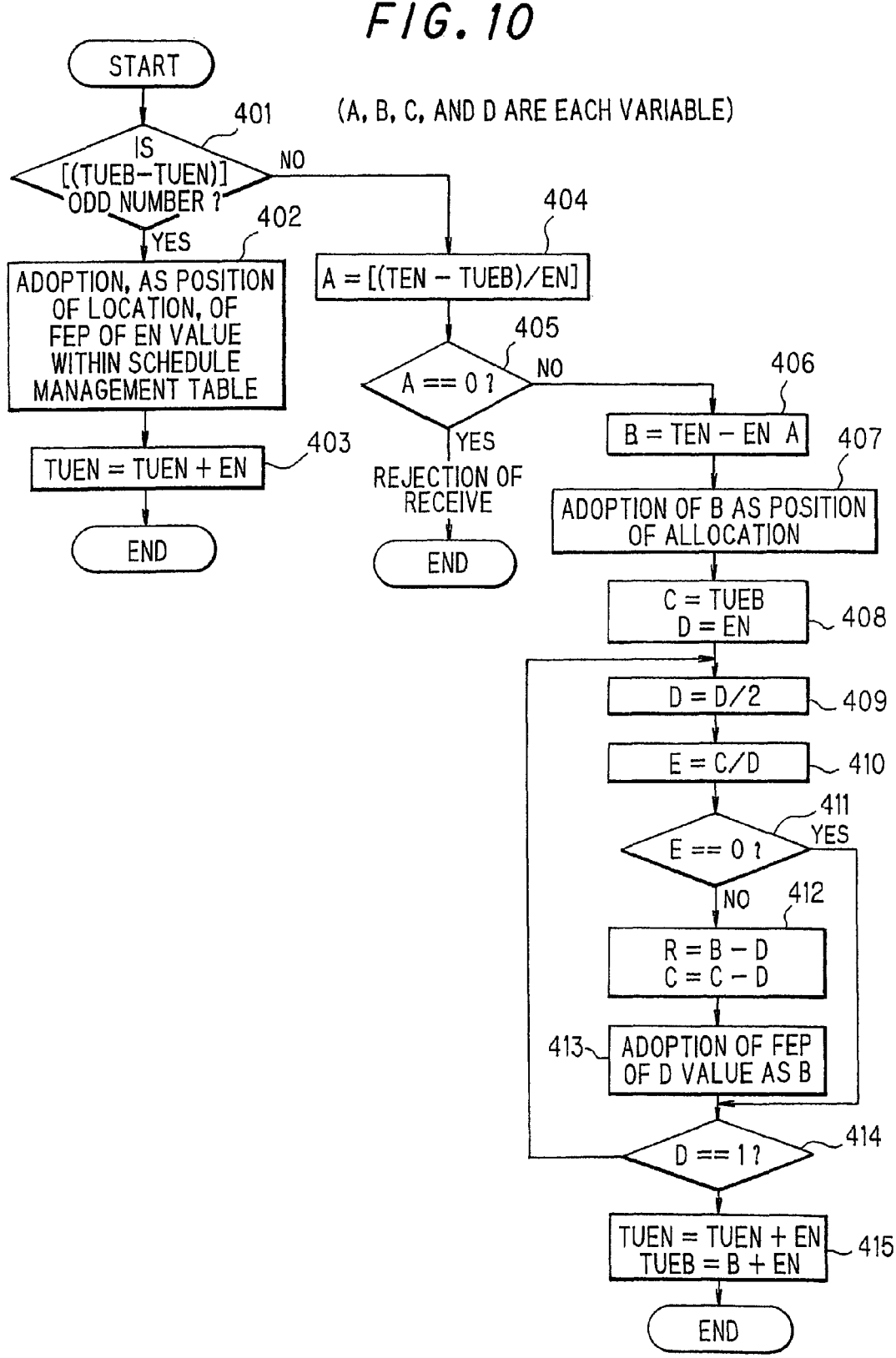
FIG. 10 is a flow chart illustrating an example of line receive processing in the first preferred embodiment of the invention.
Figure 11:
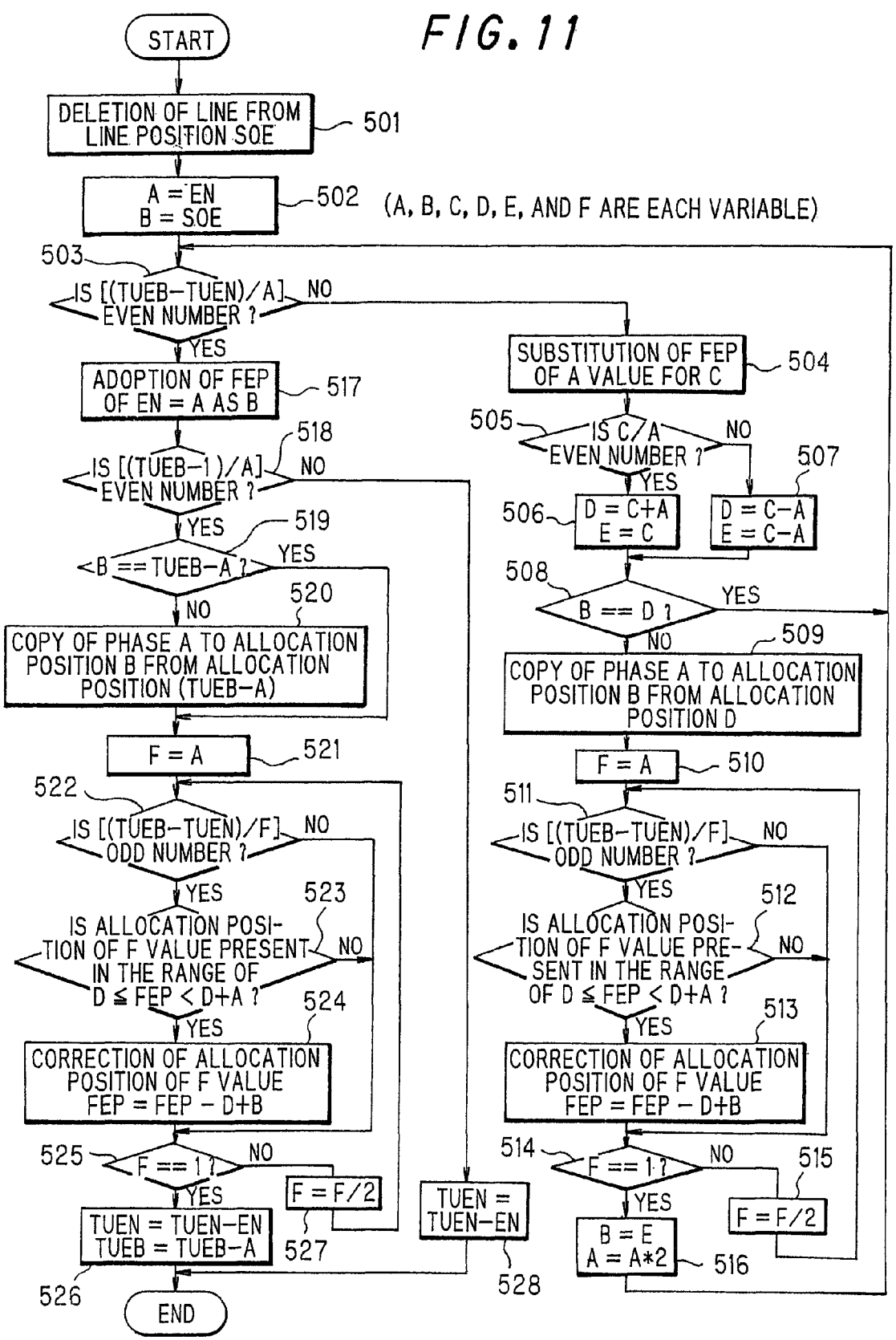
FIG. 11 is a flow chart illustrating an example of line delete processing in the first preferred embodiment of the invention.

FIG. 10 is a flow chart for explaining processing for newly receiving a line within the cell read sequence management table according to the scheduling system in the present example, and FIG. 11 is a flow chart for explaining processing for deleting a line from within the cell read sequence management table. In the flow charts, the square brackets are used for indicating a value obtained by omitting decimals of the numerical value within the square brackets (for example, [5/2]=2).

The operation of the receive of a line will be explained in conjunction with the flow chart shown in FIG. 10.

In the operation of receive of the line, whether or not the object line can be received within the cell read sequence management table is judged based on the PCR value "EN" of the line to be received. The object line to be received is cataloged in an idle area between the already cataloged lines or in an unused area at the end.

At the outset, judgment is made on whether or not an idle area, which can receive a line requested to be received, is present within the already scheduled cell read sequence management table (step 401).

When the judgment is such that an idle area corresponding to the object line is present, corresponding data "PEP" is read from the schedule management table and is decided as an allocation position of the line within the cell read sequence management table, followed by the allocation of the line to the position (step 402). This updates the cell read sequence management table, and, hence, the corresponding update is performed on the schedule management table (step 403).

In the case where the judgment on the receive of the line in an idle area is such that the line cannot be received in the idle area and, at the same time, the judgment on the receive of the line in an unused area in the cell read sequence management table (step 404) is such that the line cannot be received (step 405), the receive of the line is judged to be impossible followed by the end of the line receive processing.

Here there is a case where, even though the receive of a line in the idle area is impossible, the allocation of the line to an unused area has been judged to be possible. In this case, a position in the unused area, which can receive the line and is suitable for the receive of the line (that is, a position which is one ahead of the position corresponding to a value obtained by multiplying the PCR value by an integer), is computed (step 406), and is decided as a position for receiving the object line (step 407). After the decision of the line receive position, the schedule management table is updated.

As described in each of the above examples, the schedule management table is updated so that each line is allocated by a desired method. In this example, the schedule computation section 20 executes the following update processing.

Figure 12:
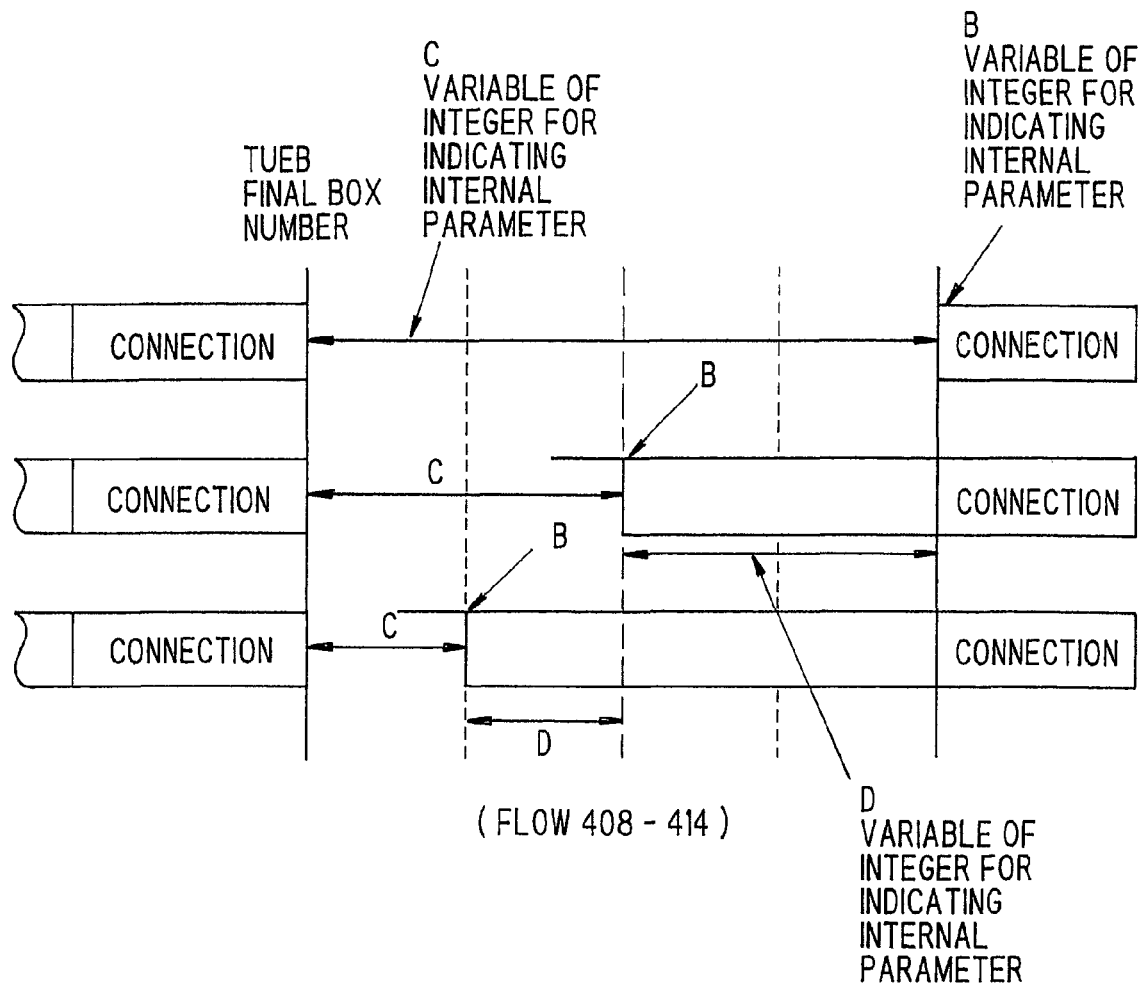
FIG. 12 is a diagram illustrating an example or update of a parameter for managing idle areas in the first preferred embodiment of the invention.

Parameters for managing a new idle area produced after the receive of a line are first updated as shown in FIG. 12 (steps 408 to 414).

Specifically, an idle area after the receive of a line is computed followed by substitution of the computation result for a parameter "C" (step 408), and the following processing is carried out one by one from lines of a smaller band than the PCR value of the received line "EN" in descending order (step 409).

At the outset, a judgment is made on whether or not the line having the PCR value can be received in the computed idle area (steps 410 and 411). When the judgment is such that the line can be received, the allocation position and the idle area are updated (step 412) followed by the cataloging of the position as the allocation position BEEPS of the line having the PCR value "EN" in the schedule management table (step 413).

In the case where the judgment on whether or not the line can be received is such that the receive is impossible and, at the same time, the connection has been judged to be final (that is, the PCR value is "1") (step 414), the total number of used entries "TUEN" and the final box number "TUEB" are updated (step 415) to complete the line receive processing.

Next, the operation in the delete of a line will be explained with reference to the flow chart shown in FIG. 11.

In the operation in the delete of a line, the line requested to be deleted is first deleted from the allocation position of the line "SOE" (step 501).

Next, the allocation move processing of the scheduled lines within the cell read sequence management table upon the delete of a line will be explained in various classified cases.

Figure 13:
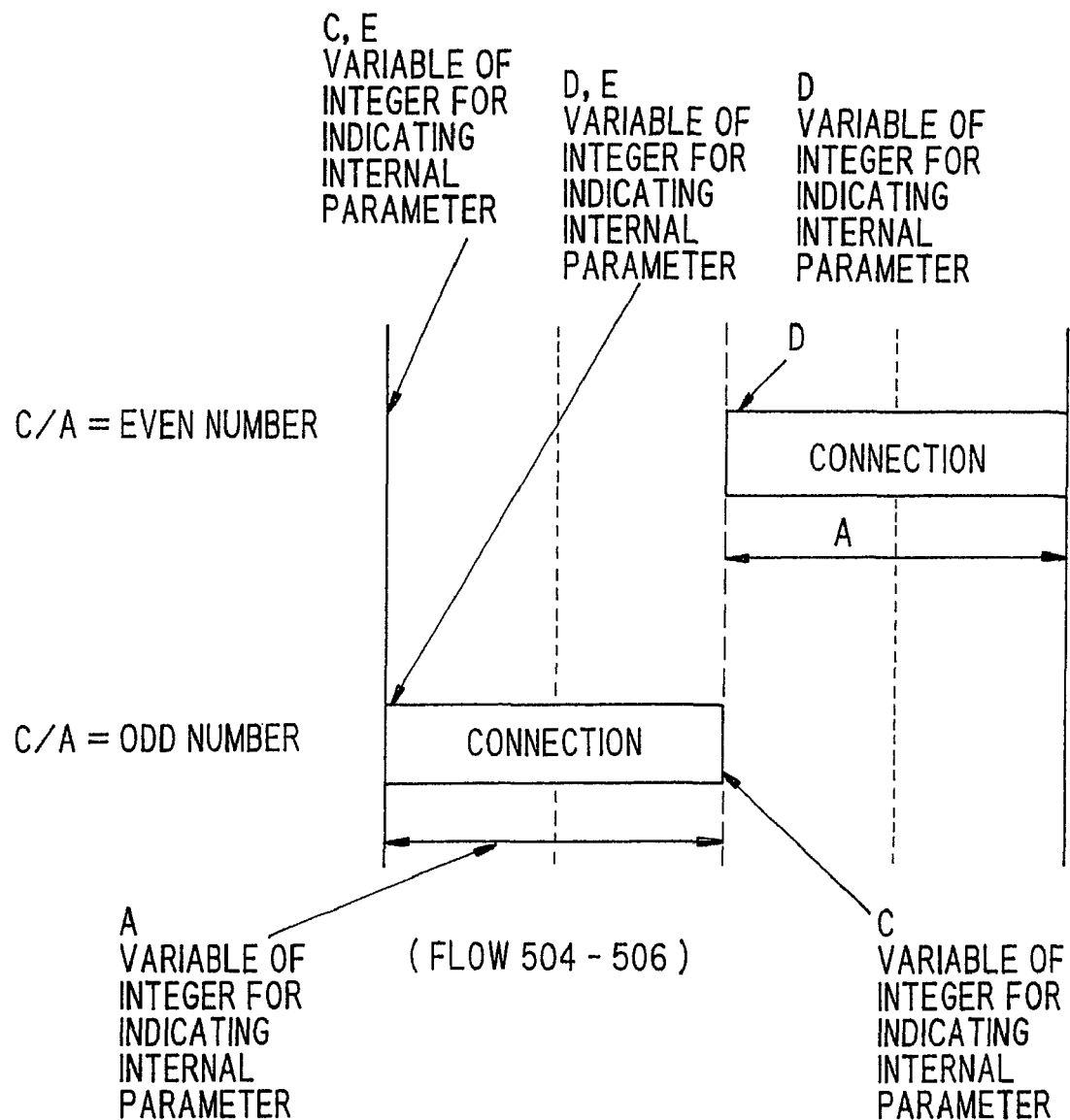
FIG. 13 is a diagram illustrating an example of computation of a position correction value with the movement of the position in the first preferred embodiment of the invention.

Here a judgment is made on whether or not an idle area corresponding to the deleted line is present within the cell read management table (stop 503). When the judgment is such that the idle area is present, a position correction value derived from the location movement is computed as shown in FIG. 13 (steps 504 to 507). Here the idle area corresponding to the line is in a state shown in FIG. 13 according to the condition in the step S05. Therefore, the allocation position after the location movement is corrected as indicated in the step 506 or step 507.

After the computation of the position correction value, the object line is moved as shown in FIG. 14 (steps 508 and 509). In this case, the condition in the step 508 is established when the length of the line to be moved is identical to the length of the deleted line. When the condition in the step 508 is not established, branching is performed without the movement of the line.

When the location move processing has been carried out, due to the update of the cell read sequence management table caused by the location movement, the values of the schedule management table are updated as shown in FIG. 15 (steps 510 to 516). In the update of the schedule management table, when the position of an idle area has been moved by the move processing (steps 511 and 512), the allocation position within the schedule management table is corrected (step 513). The above update is sequentially carried out in the descending order of PCR values of lines (step 515).

After the completion of the move processing, a larger idle area is ensured, and, consequently, in some cases, the location movement of a larger-band line can be realized. In this case, the PCR value of the line is updated, and the above procedure is then repeated (step 516).

In the branch in the step 503, when any idle area corresponding to the object line is not present within the cell read sequence management table, the next line receive position is updated (step 517), and a judgment on location movement is made (step 518). Specifically, in the case where, after the line delete processing (step 518), the location movement of the line is impossible and there is no change in the final box number "TUEB," the total number of used entries is updated to complete line delete processing (step 528).

On the other hand, when the delete of a line in accompanied by location movement, the move processing is carried out (step 520). In this case, however, when the object line to be deleted is located at the rear end of the final box number, the move processing is not carried out (step 519). The update of the schedule management parameters after the location move processing (steps 521 to 526) is the same as that in the steps 510 to 516.

After the completion of the update of the schedule management parameters, the total number of used entries "TUEN" and the final box number "TUEB" are updated to complete the line delete processing (step 527).

As explained above, according to the scheduling system of this preferred embodiment, the position of individual lines in the cell read sequence management table can be properly allocated by simple processing.

Figure 2:
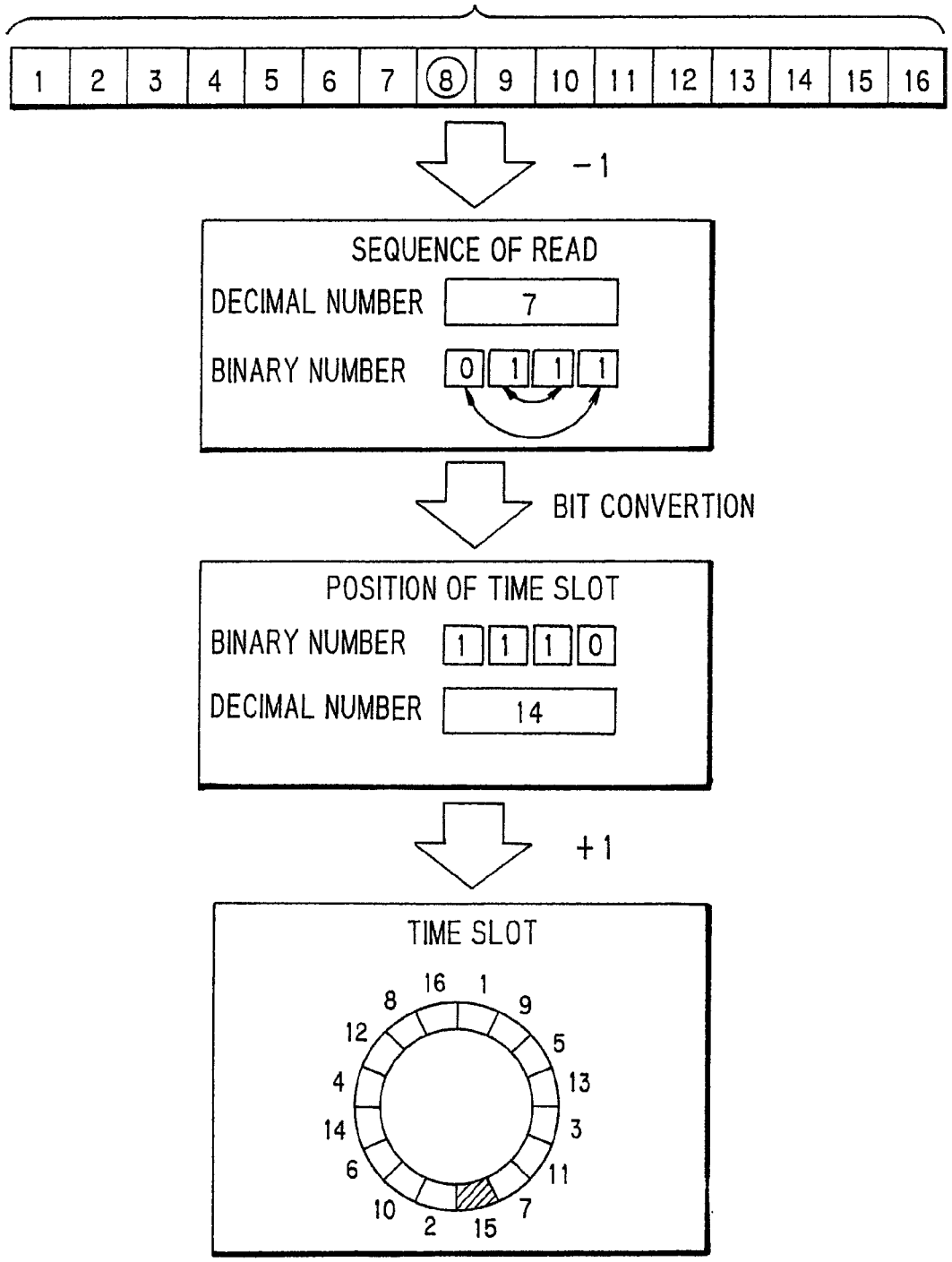
FIG. 2 is a diagram showing an example of computation in a method for converting individual positions in a cell read sequence management table respectively to positions within a time slot.

In the present preferred embodiment, the conversion method exemplified in FIGS. 2 and 3 is used in the conversion of the lines, located at the respective positions in the cell read sequence management table, to a time slot. However, when the lines are continuously ensured from a position which is one ahead of the position corresponding to a value obtained by multiplying the PCR value by an integer, the conversion method for dispersing the ensured elements at equal spacings in the time slot is not limited to the method shown in FIGS. 2 and 3, and FIGS. 2 and 3 merely illustrate one example of possible conversion methods.

In this connection, it should be noted that, in all the above-described examples, the scheduling method for a cell read sequence management table according to the scheduling system of the present preferred embodiment is not influenced by the method for converting lines to a time slot, and the same effect can be attained even when other conversion methods satisfying the above requirement for conversion to a time slot are adopted.

As described above, the scheduling system according to the invention has the following effects.

According to the scheduling system of the invention, in a cell read sequence management table for assuring the rate of ATM lines and managing the transfer of cells, making reference to a schedule management table permits the position of each line to be properly determined based on the PCR value of the line. Therefore, in the scheduling system of the invention, satisfying the requirements which have been necessary in the prior art technique, for example, the requirement for alignment in the descending order of PCR values and the requirement for the avoidance of the creation of any idle area between lines, is not required, and, thus, in the invention, scheduling can be realized in a proper and more flexible manner.

In the conventional scheduling system, in order to assure the rate of individual ATM lines, for example, in newly receiving a line or deleting a line, scheduling should be carried out in the descending order of PCR values and so that no idle area is provided between lines. For thia reason, in the prior art technique, every time when the receive of a new line, the delete of a line or the like had occurred, troublesome update processing should be carried out wherein the individual lines are aligned and rearranged.

The use of the scheduling system according to the invention can substantially eliminate the need to perform alignment and other processing every time, for example, when a line has been newly received.

Figure 1:
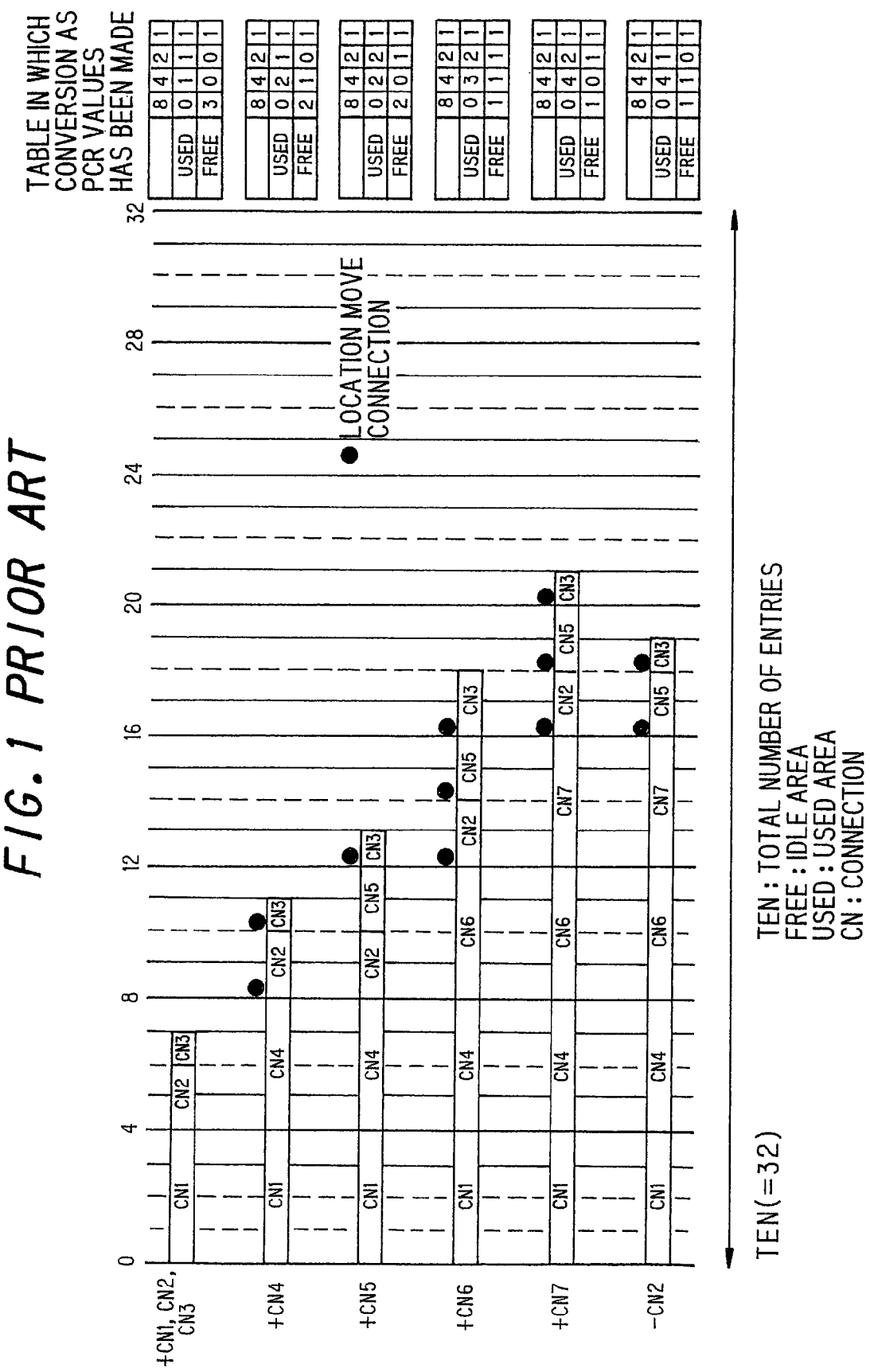
FIG. 1 is a diagram showing an example of conventional scheduling of a cell read sequence management table.

Processing, in the case where newly receiving a line and deleting a line are repeatedly carried out, according to the invention may be compared with processing, in the case where newly receiving a line and deleting a line are repeatedly carried out, according to the prior art technique by comparing FIG. 16 (invention) with FIG. 1 (prior art technique). In both FIGS. 16 and 1, identical processings for the add or delete of connection indicated from the top to the bottom in the left-side column are carried out. The comparison shows that, in the scheduling system according to the invention, the number of objects to be location moved is significantly reduced as compared with that in the prior art technique.

For example, in newly receiving a line, in the prior art technique, a part of other connections having a PCR value equal to the contemplated connection and all of connections having a smaller PCR value than the contemplated connection should be moved, whereas, in the scheduling system according to the invention, there is no need to move the connections.

On the other hand, in deleting a line, in the prior art, a part of other connections having a PCR value equal to the contemplated connection and all of connections having a smaller PCR value than the contemplated connection should be moved, whereas, in the scheduling system according to the invention, what is required is only to move one connection having a PCR value equal to or larger than the contemplated connection.

Further, also in the unused (free) area within the cell read sequence management table, the invention has no disadvantage over the prior art technique.

This is apparent from FIG. 16 (example of invention) and FIG. 1 (example of prior art) which each show a table illustrating conversion to the number of lines having PCR values obtained by raising 2 to the nth power, wherein n is an integer, in the unused area within the cell read sequence management table. The comparison of FIG. 16 with FIG. 1 shows that, in the scheduling system according to the invention, the same quantity of line as the prior art technique can be newly received in each step of this example.

As is apparent from the foregoing description, the use of the scheduling system according to the invention can significantly reduce the processing necessary for scheduling while realizing the same line capacity as the prior art technique.

The invention has been described in detail with particular reference to preferred embodiments, but it will be understood that variations and modifications can be effected within the scope of the invention as set forth in the appended claims.

What is claimed is:

1. A scheduling system, comprising:
   a read sequence management table including a plurality of positions for arranging data received from a plurality of lines;
   a schedule management table to store a plurality of peak rate values that are each associated with one of the plurality of positions of the read sequence management table; and
   a schedule computation section to:
   determine the association between each of the plurality of peak rate values and the plurality of positions based on an availability of the plurality of positions,
   store each of the associations in the schedule management table, and
   select one of the plurality of positions of the read sequence management table as a starting position to arrange data from a new line, where the selected position is based on a comparison of a peak rate value of the new line and the plurality of peak rate values stored in the schedule management table.

2. The scheduling system of claim 1, where the associations are further based on a quantity of available positions, of the plurality of positions, that are contiguous.

3. The scheduling system of claim 1, where a match between one of the plurality of peak rate values stored in the schedule management table and the peak rate value of the new line causes the schedule computation section to select the position that is associated with the matched peak rate value in the schedule management table.

4. The scheduling system of claim 3, where the selected position corresponds to an idle position in the read sequence management table that is located between previously arranged data received from different lines.

5. The scheduling system of claim 3, where the selected position corresponds to an unused position in the read sequence management table, where the unused position is located after a last position in the read sequence management table that includes previously arranged data received from a line of the plurality of lines.

6. The scheduling system of claim 1, where each time data for an additional new line is arranged in the read sequence management table, the schedule computation section modifies at least one of the plurality of positions associated with a peak rate value stored in the schedule management table.

7. The scheduling system of claim 1, further comprising:
   an allocation processor to convert each of the plurality of positions in the read sequence management table to one of a plurality of corresponding slots in a time slot.

8. A scheduling system comprising:
   a read sequence management table including a plurality of positions for arranging data received from a plurality of lines;
   a schedule management table to store a plurality of peak rate values that are each associated with one of the plurality of positions of the read sequence management table; and
   a schedule computation section to:
   determine the association between each of the plurality of peak rate values and the plurality of positions based on an availability of the plurality of positions, and
   store each of the associations in the schedule management table, where at least one of the associations between one of the plurality of positions and one of the plurality of peak rates values stored in the schedule management table is determined by multiplying the peak rate value by an integer to obtain a multiplication result and adding one to the multiplication result.

9. A scheduling method, comprising:

providing a plurality of positions for arranging data received from a plurality of lines in a read sequence management table;

providing a schedule management table to store a plurality of peak rate values that are each associated with one of the plurality of positions of the read sequence management table;

determining, with a schedule computation section, the association between each of the plurality of peak rate values and the plurality of positions based on an availability of the plurality of positions;

storing, with the schedule computation section, each of the associations in the schedule management table, and selecting, with the schedule computation section, one of the plurality of positions of the read sequence management table as a starting position to arrange data from a new line, where the selected position is based on a comparison of a peak rate value of the new line and the plurality of peak rate values stored in the schedule management table.

10. The scheduling method of claim 9, where the associations are further based on a quantity of available positions, of the plurality of positions, that are contiguous.

11. The scheduling method of claim 9, where a match between one of the plurality of peak rate values stored in the schedule management table and the peak rate value of the new line causes the schedule computation section to select the position that is associated with the matched peak rate value in the schedule management table.

12. The scheduling method of claim 11, where the selected position corresponds to an idle position in the read sequence management table that is located between previously arranged data received from different lines.

13. The scheduling method of claim 11, where the selected position corresponds to an unused position in the read sequence management table, where the unused position is located after a last position in the read sequence management table that includes previously arranged data received from a line of the plurality of lines.

14. The scheduling method of claim 9, further comprising:

modifying, with the schedule computation section, at least one of the positions associated with a peak rate value stored in the schedule management table each time data for an additional new line is arranged in the read sequence management table.

15. The scheduling method of claim 9, further comprising:

converting each of the plurality of positions in the read sequence management table to one of a plurality of corresponding slots in a time slot.

16. A scheduling method comprising:

providing a plurality of positions for arranging data received from a plurality of lines in a read sequence management table;

providing a schedule management table to store a plurality of peak rate values that are each associated with one of the plurality of positions of the read sequence management table;

determining, with a schedule computation section, the association between each of the plurality of peak rate values and the plurality of positions based on an availability of the plurality of positions; and storing, with the schedule computation section, each of the associations in the schedule management table, where at least one of the associations between one of the plurality of positions and one of the plurality of peak rates values stored in the schedule management table is determined by multiplying the peak rate value by an integer to obtain a multiplication result and adding one to the multiplication result.

17. A system comprising:

a network device to:

provide a plurality of positions for arranging data received from a plurality of lines;

determine an association between each of a plurality of peak rate values and one of the plurality of positions based on an availability of the plurality of positions;

store the association between each of the plurality of peak rate values and one of the plurality of positions, and select one of the plurality of positions as a starting position to arrange data from a new line, where the selected position is based on a comparison of a peak rate value of the new line and the plurality of stored peak rate values.

18. The system of claim 17, where the associations are further based on a quantity of available positions, of the plurality of positions, that are contiguous.

19. The system of claim 17, where at least one of the associations between one of the plurality of peak rates values and one of the plurality of positions is determined by multiplying the peak rate value by an integer to obtain a multiplication result and adding one to the multiplication result.

* * * * *